United States Patent [19]

Latge

[11] Patent Number: 4,693,088
[45] Date of Patent: Sep. 15, 1987

[54] COLD TRAP FOR ELIMINATING IMPURITIES FROM A POLLUTED LIQUID METAL

[75] Inventor: Christian Latge, Aix en Provence, France

[73] Assignee: Commissariat a l'Energie Atomique, Paris, France

[21] Appl. No.: 890,480

[22] Filed: Jul. 30, 1986

[30] Foreign Application Priority Data

Aug. 12, 1985 [FR] France ................. 85 12279

[51] Int. Cl.$^4$ .......................................... B01D 8/00
[52] U.S. Cl. .................................. 62/55.5; 55/269; 165/119; 210/186
[58] Field of Search ................. 62/55.5; 55/269; 165/119; 210/186

[56] References Cited

U.S. PATENT DOCUMENTS

| | | | |
|---|---|---|---|
| 3,552,485 | 1/1971 | Le Jannou et al. | 165/119 |
| 4,278,499 | 7/1981 | Abramson et al. | 62/55.5 |
| 4,432,208 | 2/1984 | Onuki et al. | 55/169 |
| 4,488,964 | 12/1984 | Mitsutsuka | 62/55.5 |

FOREIGN PATENT DOCUMENTS 0082063  6/1983  European Pat. Off. .
A-1549434  12/1968  France .

*Primary Examiner*—Ronald C. Capossela

[57] ABSTRACT

Cold trap for eliminating the impurities present in a polluted liquid metal. It comprises a body provided with an intake pipe for the polluted liquid metal and an internal structure defining a passage for the metal, said structure being successively provided with means for cooling the liquid so that it can be cooled to a cold point temperature below the impurity saturation temperature and bring about a crystallization of the impurities, means for retaining the impurities and a discharge pipe for discharging from the body the impurity-free metal and means for reinjecting upstream of the cooling means part of the fluid which has passed through the impurity retention means. Application to liquid metal-cooled nuclear reactors.

9 Claims, 4 Drawing Figures

COLD TRAP FOR ELIMINATING IMPURITIES FROM A POLLUTED LIQUID METAL

BACKGROUND OF THE INVENTION

The invention relates to a cold trap for eliminating impurities from a polluted liquid metal. A liquid metal, e.g. sodium, potassium or lithium, or one of the alloys thereof, circulating as a heat exchange medium, is subject to the formation of impurities in the form of oxides, hydrides, hydroxides of metallic particles and carbon.

Cold traps are incorporated into the circuit of said liquid metal to eliminate the impurities therefrom. In the case of a nuclear reactor, they exist on the primary circuit and on the secondary circuit. In these traps, the metal is cooled to below the soluble impurity saturation temperature. For this purpose, they have an external cooling device for cooling the liquid metal from the intake temperature to a temperature below the impurity saturation of the liquid metal, so as to mainly crystallize the soluble impurities. Moreover, the cold traps generally have a recuperation-type heat exchanger or recuperator, in which the liquid metal to be purified and which enters the trap gives of part off its heat to the purified liquid metal leaving the trap. Finally, they have lining members forming a porous medium to hold back the crystallized solid matter and filter the insoluble particles.

A cold trap of this type is already known (FR-A-No. 1 549 434). It comprises a vertically positioned cylindrical body, which is closed in its upper part and in its lower part by a convex base. Within said body is provided a cylindrical ferrule arranged coaxially to the body, so as to define an annular space with the inner wall of said body. A lining member is placed within the ferrule. The polluted or contaminated liquid metal is introduced into the upper part of the body and circulates in the annular space between body and ferrule.

A casing outside the body and in which is ensured a flow of the cooling fluid, makes it possible to cool the lower part of the body and consequently reduce the temperature of the liquid metal to below its impurity saturation temperature. The impurities are normally held back on the lining member.

The liquid metal then rises in the interior of the ferrule and passes through a heat exchange circuit with the polluted hot liquid metal. It is then discharged from the body.

The present invention relates to a cold trap having improved performance characteristics compared with the prior art cold traps.

It is firstly advantageous to increase the retention capacity of a cold trap. Thus, during its operation, the cold trap is progressively filled with impurities. When the trap is filled, it must be emptied or changed, so that it can again fulfill its function in a satisfactory manner. Obviously on increasing the retention capacity of a cold trap, the number of traps necessary for purifying a given sodium quantity would be smaller. Thus, the traps would have to be emptied less frequently.

In particular in the case of an integrated fast neutron nuclear reactor, i.e. of the type in which the exchangers and pumps of the primary circuit are located within the vessel and are immersed in a liquid metal volume, the traps of the primary circuit can be advantageously located in the main vessel. Obviously, in order to reduce the size and dimensions of the vessel, the components located in the latter must be as small as possible. It would therefore appear desirable to design a cold trap having reduced dimensions, so that it can be advantageously located in the vessel of an integrated nuclear reactor, whilst also havina a large retention capacity, which would appear to be contradictory in the light of the prior art.

The present invention relates to a cold trap making it possible to solve this problem.

Moreover, particularly in the case of a cold trap of the primary circuit of an integrated fast neutron nuclear reactor, the duration of a purification campaign for a given mass of liquid metal also constitutes a very important factor.

Thus, it is known that the mass of liquid metal is exposed to two different types of pollution. A first pollution type is released at the start of the operating cycle by fuel assembly surfaces. This pollution occurs once during the life of the assemblies. It constitutes a mixed hydrogen—oxygen pollution. There is also a continuous pollution by hydrogen and tritium linked with the operation of the reactor.

It is known that hydrogen and tritium are liable to diffuse towards the secondary circuits through the walls of intermediate exchangers. The continuous hydrogen and tritium pollution could thus be eliminated by cold traps of secondary circuits in the form of hydrides.

However, the oxygen pollution must be eliminated by a primary circuit cold trap in the form of oxides and it is advantageous to perform this purification as quickly as possible, at the start of the cycle, before excessive quantities of hydrides have had a chance to be fixed in the trap.

Moreover, if there is a sodium—water reaction in a secondary circuit, it is necessary to rapidly purify the liquid metal to reduce risks of clogging and corrosion at certain points of the circuit.

The present invention also relates to a cold trap making it possible to reduce the duration of a purification campaign as a result of increases efficiency.

SUMMARY OF THE INVENTION

The present invention therefore specifically relates to a cold trap for eliminating the impurities present in a polluted liquid metal, comprising a body equipped with an admission pipe for the polluted liquid metal and an internal structure defining a path for the metal, said structure being successively provided with means for cooling the liquid metal so that it can be cooled to a cold point temperature below the impurity saturation temperature and can bring about a crystallization of the impurities, means for retaining impurities and a discharge pipe for discharging the impurity-free metal from the body, wherein it comprises means for recycling upstream of the cooling means part of the fluid which has passed through the impurity retention means, the ratio of the recycled flow to the intake flow being called the recycling rate $\alpha$.

Preferably, the body comprises three zones, namely a heat recuperation or recovery zone in which the polluted metal entering the body and the relatively cooler purified fluid circulate in heat exchange relationship, a cooling zone of the liquid, in which the liquid metal is cooled to a cold point temperature below its saturation temperature and an impurity deposition zone located in the lower part of the body.

In the impurity deposition zone is placed a cellular structure in which deposition takes place by decanting or settling. Settling is an important characteristic of the operation of a cold trap according to the invention.

Thus, according to the prior art, e.g. the cold trap of FR-A-No. 1549434, nucleation solely occurs on the lining surfaces. Therefore this lining, which is generally of steel wool clogs, which leads to a reduction in the capacity and efficiency of the trap, as well as the extending of purification campaign.

However, according to the invention, the nuclei are essentially produced by settling. Thus, the metal wool is not clogged by the impurities, so that the wool volume can be reduced, which leads to a reduction in the overall dimensions of the trap.

Preferably, the cold trap has a box located in the heat recuperation zone and which defines an annular space with the wall of the body and a bundle of tubes disposed in said annular space, the purified fluid entering at one end of the tubes and being discharged at the other end into the discharge pipe.

BRIEF DESCRIPTION OF THE DRAWINGS

The invention is described in greater detail hereinafter relative to non-limitative embodiments and the attached drawings, wherein shown.

DETAILED DESCRIPTION OF THE PREFERRED EMBODIMENTS

Figure 1:
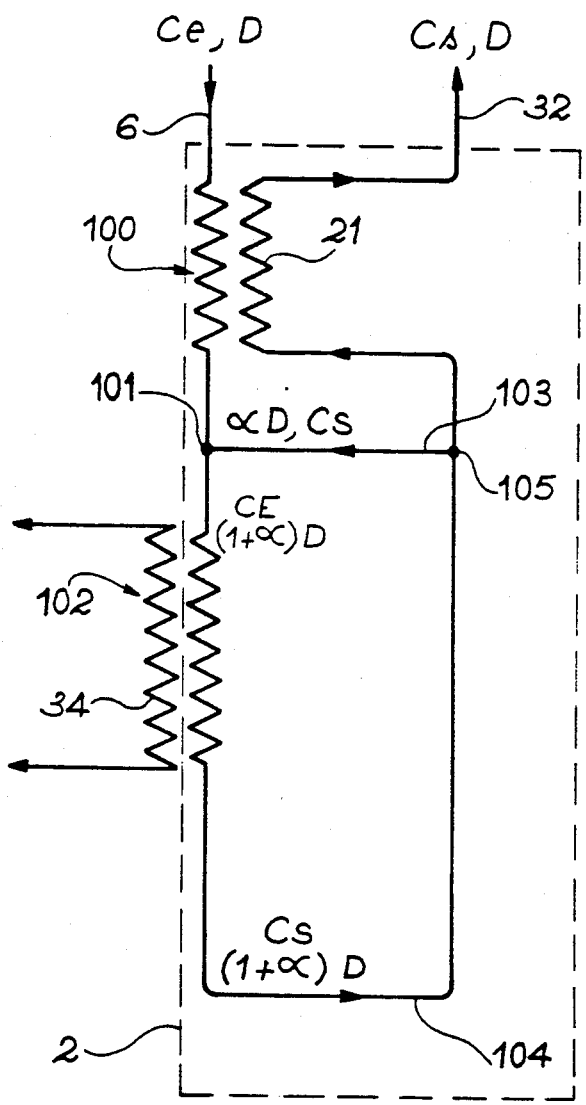
FIG. 1, a basic diagram of the circulation of the liquid within a cold trap according to the invention.

FIG. 1 diagrammatically shows the circulation of a liquid metal within a cold trap according to the invention. the polluted sodium enters the trap through duct 6 and its concentration in impurities is Ce and its flow rate D.

In exchanger-economizer 100, said polluted sodium undergoes a first cooling in contact with the purified sodium circulating in countercurrent in duct 21. At point 101, to which leads duct 103 by which is recycled part $\alpha.D$ (in which $\alpha$ designated the recycling rate) of the purified sodium flow, the flow increases and becomes $D(1+\alpha)$. Therefore the concentration of impurities drops and becomes Ce.

When the polluted sodium has been cooled to the cold point temperature TpF, nucleation starts and crystals develop. They are deposited in deposition zone 104, so that the concentration of impurities drops and becomes Cs, the flow remaining unchanged.

At branch 105, part $\alpha.D$ of said purified sodium is recycled in the polluted sodium, as stated hereinbefore. On traversing cooling means 102, the polluted fluid is cooled by a cooling fluid circulating in duct 34.

Figure 2:
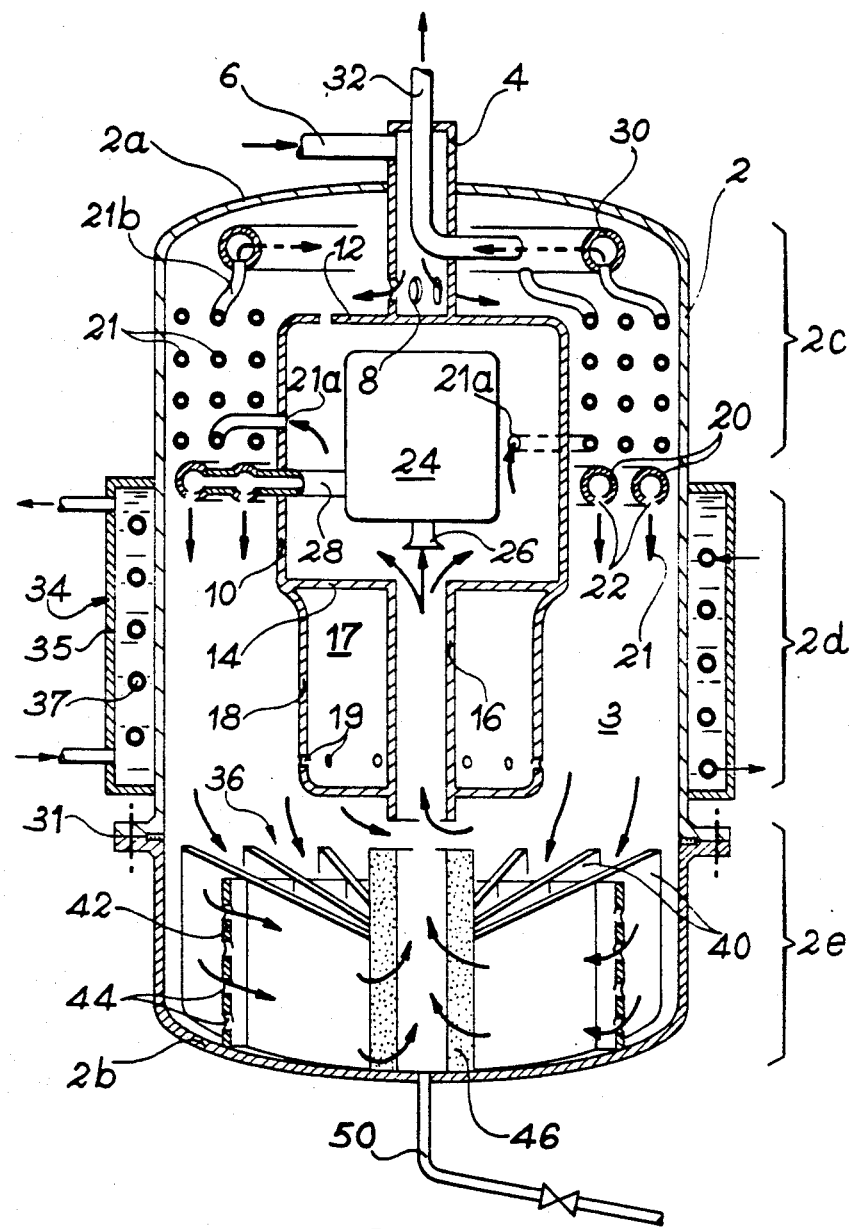
FIG. 2, a diagrammatic sectional representation of a first embodiment of a cold trap according to the invention.

FIG. 2 shows a first embodiment of a cold trap according to the invention. It comprises a body 2 constituted by a cylindrical part, which is sealed in its upper portion and in its lower portion by convex bases 2a, 2b. Body 2 defines an inner volume 3 within which is ensured a circulation of the liquid metal to purified. This metal is e.g. primary or secondary sodium from a primary or secondary circuit of a fast neutron nuclear reactor. In the upper part of body 2 is provided an intake pipe 4 for the polluted metal and a supply duct 6 connected to said pipe 4. In the lower part of intake pipe 4 is provided a plurality of passage holes 8 distributed along a circumference. A cylindrical box 10, which is closed in its upper part by a flat base 12 and in its lower part by a flat, circular base 14 is fixed to the lower end of intake pipe 4. In the centre of base 14 is connected a vertical supply passage 16, which is duplicated by an external ferrule 18, which makes it possible to define an annular path with the cylindrical wall of body 2, in order to regularize the liquid metal outflow. Ferrule 18 and passage 16 define a space 17 containing stagnant sodium, which communicates with volume 3 by holes 19 made in the ferrule. Around box 10 are provided two concentric distributors 20, each constituted by a torus having a relatively large diameter and which has distributed holes 22 directed towards the bottom part of body 2. In the internal volume defined by box 10 is provided an e.g. electromagnetic pump, diagrammatically represented at 24. The pump has an intake pipe 26 and one or more delivery ducts 28 connected to the internal volume of distributors 20.

Around box 10 and above distributors 20 is provided a bundle of helical tubes 21. Each tube has a first end 21a, which issues into the internal volume defined by box 10 and a second end 21b, which issues into a toroidal main 30 arranged concentrically to the longitudinal axis of body 2. A duct 32 for discharging the liquid metal out of body 2 is connected to main 30.

The bundles of tubes 21 constitutes a heat exchanger, called an exchanger-economizer. The polluted, hot fluid circulating outside the tubes is cooled by the purified fluid circulating inside said tubes. Thus, the temperature of the polluted fluid in the bottom part of exchange zone 2c is reduced. Therefore, the heat quantity which still has to be extracted therefrom to bring its temperature below the saturation temperature is reduced.

In the median zone of body 2d are provided cooling means for discharging part of the heat of the liquid metal located in said zone. In the represented embodiment, these cooling means 34 comprise a jacket 35 containing a good heat conducting medium (e.g. NaK) and a duct 37 helically wound around body 2 and which is traversed by a cooling fluid.

In the lower part 2e of body 2 is provided a settling and filtering zone. Preferably a cellular structure 36 rests on the bottom of the body. This structure is constituted by plurality of radially positioned vertical partitions 40 and by one or more circular partitions 42 having passage holes 44 for the liquid metal. This structure is preferably dismantlable, so as to make it possible to change the lining element or filtering element 46 located in the centre of said structure and which serves to hold back the crystals contained in the liquid metal. Element 46 is constituted by a cylinder with relatively thick walls arranged coaxially to the longitudinally axis of body 2. It is appropriately and particularly formed from stainless steel wool. The settling zone 2e is isothermic because, in said zone there is no heat exchange with an external fluid or with another fluid stream circulating in the body.

In order to be able to extract and clean the cellular structure and the filtering element 46, a clamp 31 is provided, which makes it possible to obtain access to the interior of body, after emptying the cold trap by a duct 50 especially provided for this purpose.

In this embodiment, a small space has been left between the lower end of passage 16 and the upper edge of element 46, so as to permit a passage of sodium in the case of element 46 being obstructed.

The cold trap functions as follows. The polluted sodium containing the impurities to be eliminated, such as oxides, hydrides, hydroxides and metallic particles is brought by duct 6 to the supply or admission pipe 4. It passes through the latter from top to bottom to the passage orifices 8. After traversing the latter, the sodium is admitted into volume 3 defined by body 2. It flow round box 10 and circulates from top to bottom in the annular space between said box and the inner wall of the cylindrical part of body 2 in heat exchange relationship with the relatively colder sodium circulating in counter current in the tubes 21 of the helical bundle. In other words, the polluted fluid is cooled, whilst the purified fluid is heated. At distributors 20, part $\alpha.D$ of the purified cold sodium flow (whose value can be adjusted by regulating the operating conditions of pump 24) is recycled and distributed at the intake of cooling zone 2d. Cold sodium jets 21 from distributors 20 are formed at each orifice 22. The cold sodium from these jets and having a higher density than the hot sodium flow towards the lower part of the cooling zone. Thus, jets 21 constitute a tubular, wall-free cooler and generate very high thermal gradients at the boundary between the hot sodium and the cold sodium. These thermal gradients aid the nucleation of the sodium hydride crystals and are accompanied by a very high sodium supersaturation.

Moreover, during its passage in cooling zone 2d, the polluted sodium is cooled externally by means 34, which discharge out of the trap part of the heat of the sodium. Thus, the sodium is cooled both by the fraction of the recycled sodium flow and by the external cooler.

The nuclei liable to be formed in the sodium flow are entrained towards the bottom part 2e of the cold which forms a settling zone, where the held back crystals can enlarge by diffusion from the local supersaturation in the immediate vicinity of the crystalline surfaces available for growth.

In other words, local supersaturation makes it possible to form the first crystals. Once the crystallization reaction has been initiated, it is propagated because the presence of these first crystals facilitates the formation of new crystals, which activates the crystallization. Thus, the essence of the deposition of the impurities takes place in the cellular structure 42, 44 without clogging the lining element 46.

As the cooling power is significantly increased, the difference between the temperature of the sodium leaving the exchanger-economizer and the cold point temperature is greater than in a conventional cold trap. Thus, during a purification campaign, this makes it possible to reduce the number of reference changes for the cold point temperature, so that the cold trap operates much more flexibly.

The sodium passes through the cellular structure circulating through passage holes 44 and then element 46. The sodium is then sucked into passage 16 and enters box 10. A fraction of the flow is sucked in by the electromagnetic pump 24 and delivered to distributors 20. The remaining fraction of the purified sodium enters the tubes of the helical bundle, passes through the same and is heated before entering main 30. It is then discharged from the trap by discharge duct 32.

Figure 3:
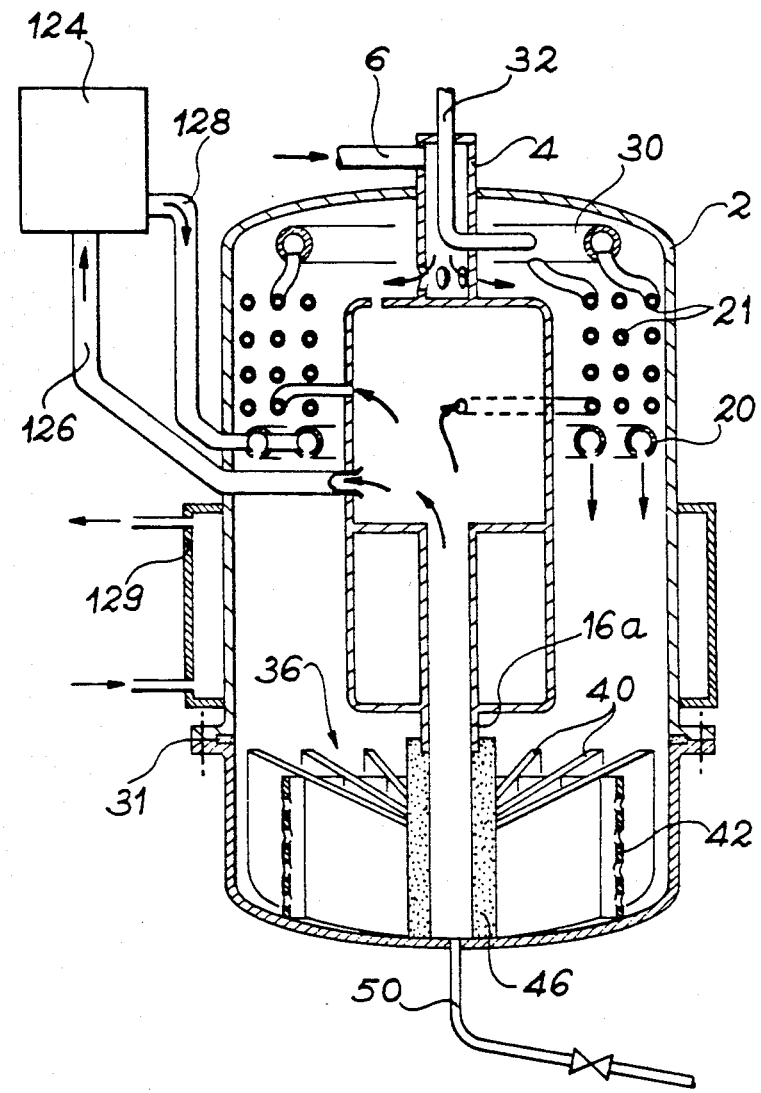
FIG. 3, another example of a cold trap according to the invention and which has constructional variants.

FIG. 3 shows another embodiment of a cold trap according to the invention, which has a number of variants.

Firstly, pump 124 making it possible to recycle part of the purified sodium is located outside envelope 2. Therefore there is a duct 126 connecting the internal volume of box 10 to pump 124 and a delivery duct 128, which supplies the sodium to distributors 20.

In this embodiment, the external cooling means making it possible to discharge part of the heat of the sodium to be purified into the cooling zone 2d (cf FIG. 2) are constituted by an annular passage, which surrounds the body 2 and which is traversed by a fresh cooling air current.

Moreover, it should be noted that passage 16 has an extension 16a, which extends until it is in contact with element 46, so as to leave no free space for a short-circuit circulation of the sodium from the cooling zone to the passage. Therefore the sodium has to pass through element 46. This extension 16a can optionally have a sodium passage device which automatically opens beyond a pressure drop threshold linked with the clogging of element 46.

Obviously each of the variants described with reference to FIG. 3 could be used in the embodiment of FIG. 2 and vice-versa. Thus, for example, there could be a cold trap according to FIG. 2, but which has a pump located outside envelope 2, its other characteristics remaining unchanged.

Figure 4:
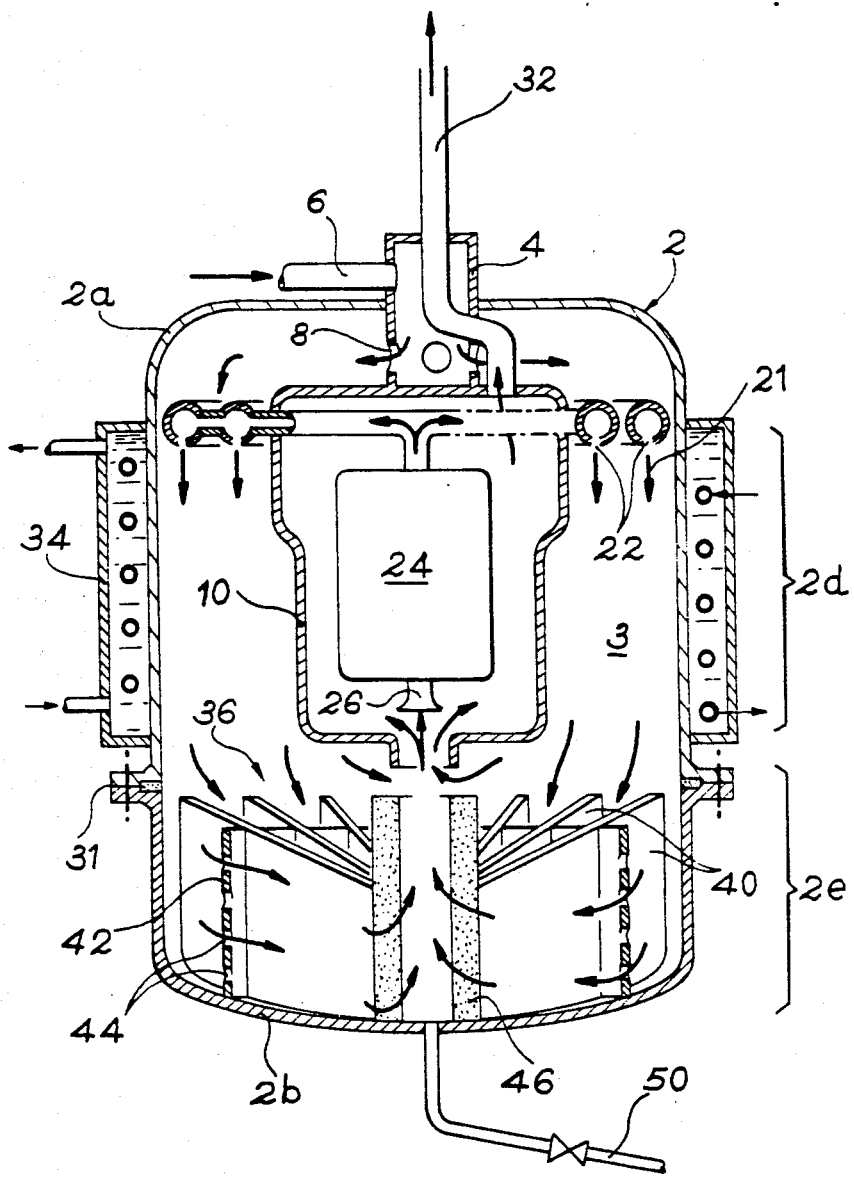
FIG. 4, another embodiment of a cold trap according to the invention.

FIG. 4 shows a second constructional variant of a cold trap according to the invention. Its overall dimensions and in particular its height are reduced compared with the embodiment of FIGS. 2 and 3. Thus, the intake passage is very short and the outer ferrule 18 (cf FIG. 2) has been eliminated, so that the pump 24 can be positioned lower, i.e. level with the exchanger-economizer. In addition, distributor 30 has been positioned level with the upper part of box 10.

As has been explained hereinbefore, the main feature of a cold trap according to the invention is that part of the purified sodium flow is recycled into the polluted sodium stream. As a result of this feature, supersaturated sodium is produced in the cold trap, which can be revealed by the following example.

A mixture of two equal flows of saturated sodium with different temperatures is produced, e.g. a first flow at a temperature of 300° C. and a second flow at a temperature of 200° C. This gives a sodium flow with a temperature of 250° C.

The following resulting concentration is obtained:

$$[CE = \tfrac{1}{2} C^*(300° \text{ C.}) + \tfrac{1}{2}.C^*(200° \text{ C.})].$$

In this formula $C^*(300°$ C.) and $C^*(200°$ C.) represent the equilibrium concentrations at 300° C. and 200° C. respectively for a given impurity. More precisely, for sodium oxide, the concentration will be $CE_0$ with: $CE_0 = \tfrac{1}{2}(96.38 + 12.08) = 54.23$ μg.gNa$^{-1}$.

Such a concentration of 54.23 μg.Na$^{-1}$ corresponds, on the sodium oxide solubility curve, to a temperature of 268.2° C., i.e. a temperature above 250° C.

In the same way, for sodium hydride:

$$CE_H = \tfrac{1}{2}(4.6 + 1.19) = 8.38 \text{ μg.gNa}^{-1}$$

which corresponds to a saturation temperature of 272.1° C.

The temperature of the resulting stream is 250° C., whereas the saturation temperatures with respect to sodium oxide and sodium hydride are respectively 268.2° C. and 272.1° C. These saturation temperatures are above the temperature of the mixture, namely 250° C. Thus, supersaturations are produced by temperature differences of 18.2° C. (for the oxide) and 22.1° C. (for the hydride).

These large supersaturations are produced by simply mixing two sodium flows without heat dissipation, i.e. without any supply of frigories from the outside.

As a result of this supersaturation effect by mixing the duration of a purification campaign by means of a cold trap according to the invention is reduced by approximately 30 to 50% compared with a prior art cold trap. Taking account of the consumption of frigories of the cold trap and the reduction in the duration of the purification campaign leads to optimum values of the recycling rates between 1 and 2.

Obviously, the invention is not limited to the embodiments described and represented and in fact covers all variants thereof.

What is claimed is:

1. A cold trap for eliminating the impurities present in a polluted liquid metal, comprising a body equipped with an admission pipe for the polluted liquid metal and an internal structure defining a path for the metal, said internal structure being successively provided in the direction of flow therethrough with means positioned in said body for cooling the liquid metal so that it can be cooled to a cold point temperature below the impurity saturation temperature for bringing about a crystallization of the impurities, means mounted in said body for receiving liquid metal from said cooling means and for retaining impurities, and a discharge pipe connected to said body to receive liquid metal from said means for retaining impurities for discharging the impurity-free metal from the body, and means located in said body upstream of the cooling means in the direction of liquid metal flow through said body for recycling part of the fluid which has passed through the impurity retention means back through said cooling means and said means for retaining impurities.

2. A cold trap according to claim 1, wherein the body comprises three zones, namely a heat recuperation zone in which the polluted metal entering the body and the relatively colder purified fluid circulate in heat exchange relationship, a cooling zone for the liquid fluidly connected to said heat recuperation zone, in which the liquid metal is cooled to a cold point temperature below its saturation temperature and an impurity deposition zone fluidly connected to said cooling zone and located in the lower part of the body.

3. A cold trap according to claim 1, further including a box located in the heat recuperation zone and which defines an annular space with the wall of the body and a bundle of tubes disposed in said annular space, each of said tubes being in fluid communication with said box and said discharge pipe whereby the purified fluid enters each of the tubes at a first end and is discharged at a second end which is fluidly connected to the discharge pipe.

4. A cold trap according to claim 1, wherein the means for recycling part of the purified liquid metal include at least one annular distributor in said body and surrounding the box, said annular distributor being fluidly connected to the interior of said box and having orifices, therein for issuing liquid metal into the cooling zone.

5. A cold trap according to claim 1, further including an internal pump mounted in said body to be in fluid communication with said impurity retention means and with said recycling means for supplying purified liquid metal to said recycling means.

6. A cold trap according to claim 1, further including an external pump and an external flow circuit fluidly connected to said body for reinjecting purified fluid into said body.

7. A cold trap according to claim 1, wherein said means for retaining impurities includes a cellular structure located in said body for the impurities and a lining element located in the center of the cellular structure.

8. A cold trap according to claim 7, wherein the cellular structure is constituted by a plurality of plates mounted in said body to radiate away from each other and at least one tubular partition mounted in said body and having passage orifices.

9. A cold trap according to claim 1, wherein the ratio of recycled flow to intake flow is between 1 and 2.

* * * * *